(12) United States Patent
Hung et al.

(10) Patent No.: US 9,602,001 B1
(45) Date of Patent: Mar. 21, 2017

(54) BUCK CONVERTER WITH A VARIABLE-GAIN FEEDBACK CIRCUIT FOR TRANSIENT RESPONSES OPTIMIZATION

(71) Applicants: NATIONAL CHENG KUNG UNIVERSITY, Tainan (TW); MEGAWIN TECHNOLOGY CO., LTD., Zhubei, Hsinchu County (TW)

(72) Inventors: Ting-Hsuan Hung, Hsinchu (TW); Szu-Yu Huang, Tainan (TW); Tai-Haur Kuo, Tainan (TW); Kow-Liang Wen, Zhubei (TW)

(73) Assignees: NATIONAL CHENG KUNG UNIVERSITY, Tainan (TW); MEGAWIN TECHNOLOGY CO., LTD., Zhubei, Hsinchu County (TW)

( * ) Notice: Subject to any disclaimer, the term of this patent is extended or adjusted under 35 U.S.C. 154(b) by 0 days.

(21) Appl. No.: 14/935,149

(22) Filed: Nov. 6, 2015

(51) Int. Cl.
*H02M 3/158* (2006.01)
*H02M 1/00* (2006.01)

(52) U.S. Cl.
CPC .... *H02M 3/158* (2013.01); *H02M 2001/0009* (2013.01)

(58) Field of Classification Search
CPC .... H02M 3/158; H02M 3/1588; H02M 3/156; H02M 3/157; H02M 2003/1566
See application file for complete search history.

(56) References Cited

U.S. PATENT DOCUMENTS

| | | | | |
|---|---|---|---|---|
| 6,396,252 B1* | 5/2002 | Culpepper | ............ | H02M 3/156 323/225 |
| 7,245,113 B2* | 7/2007 | Chen | ................... | H02M 3/1588 323/271 |
| 8,593,125 B1* | 11/2013 | Xue | ....................... | H02M 3/156 323/280 |
| 2003/0090237 A1* | 5/2003 | Shenai | ................... | H02J 7/0052 320/139 |
| 2007/0035281 A1* | 2/2007 | Kuroiwa | ............... | H02M 3/156 323/222 |
| 2007/0063681 A1* | 3/2007 | Liu | ....................... | H02M 3/1588 323/282 |
| 2009/0128113 A1* | 5/2009 | Ryoo | ....................... | G05F 1/618 323/283 |
| 2009/0243575 A1* | 10/2009 | Akiyama | .............. | H02M 3/156 323/282 |

(Continued)

*Primary Examiner* — Timothy J Dole
*Assistant Examiner* — Yusef Ahmed
(74) *Attorney, Agent, or Firm* — patenttm.us

(57) ABSTRACT

A buck converter includes a power stage circuit and a control circuit. The power stage circuit has a pair of switches, an output inductor, and an output capacitor. The control circuit has a current-sensing unit (CCS), an error-amplifying (EA) and transient-holding (TH) unit, a transient-optimized feedback unit (TOF), and a PWM generation unit. The CCS senses an output capacitor current. The EA with the TH receives a feedback voltage and a reference voltage to generate an error signal. The TOF receives the feedback voltage and the reference voltage to generate a proportional voltage signal by a variable gain value. The PWM generation unit receives the proportional voltage signal and a sensing voltage signal to generate a PWM signal. When the proportional voltage signal equals the sensing voltage signal, the switches are controlled by the PWM signal at an optimal time point so that transient responses are optimized.

11 Claims, 11 Drawing Sheets

(56) References Cited

U.S. PATENT DOCUMENTS

| | | | |
|---|---|---|---|
| 2009/0267580 A1* | 10/2009 | Derksen | H02M 3/158 323/282 |
| 2009/0322299 A1* | 12/2009 | Michishita | H02M 3/156 323/282 |
| 2010/0026262 A1* | 2/2010 | Sase | H02M 3/156 323/283 |
| 2011/0241641 A1* | 10/2011 | Chen | H02M 3/1588 323/284 |
| 2012/0038334 A1* | 2/2012 | Peng | H02M 3/1588 323/282 |
| 2012/0229113 A1* | 9/2012 | Houston | H02M 3/1588 323/288 |
| 2012/0242300 A1* | 9/2012 | Ueno | H02M 3/156 323/234 |
| 2013/0015830 A1* | 1/2013 | Zhang | H02M 1/14 323/282 |
| 2013/0342181 A1* | 12/2013 | Suppanz | H02M 3/1582 323/271 |
| 2014/0292300 A1* | 10/2014 | Yan | H02M 3/157 323/288 |
| 2014/0293658 A1* | 10/2014 | Cao | H02M 3/33576 363/21.02 |
| 2015/0008895 A1* | 1/2015 | Weng | H02M 3/156 323/285 |
| 2015/0028830 A1* | 1/2015 | Chen | H02M 3/158 323/271 |
| 2015/0061632 A1* | 3/2015 | Philbrick | H02M 3/158 323/290 |
| 2015/0200593 A1* | 7/2015 | Stoichita | H02M 3/158 323/271 |
| 2015/0365002 A1* | 12/2015 | Cao | H02M 3/33507 363/21.01 |
| 2016/0087530 A1* | 3/2016 | Gambetta | H02M 3/156 323/271 |

* cited by examiner

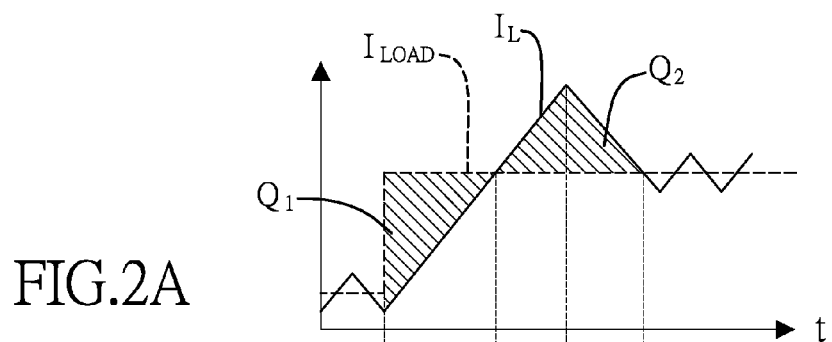
FIG.2A
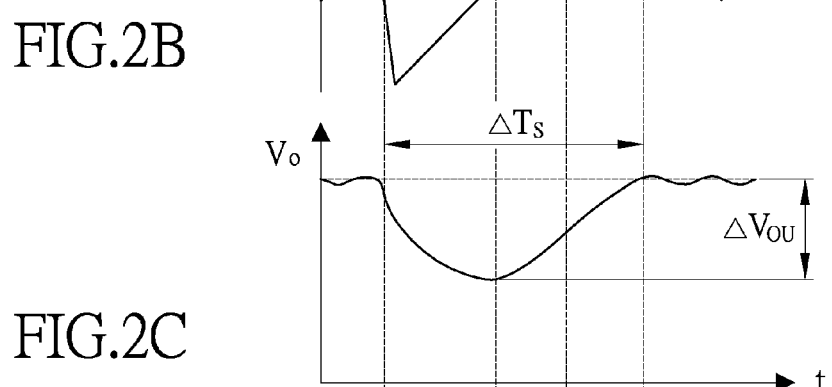
FIG.2B
FIG.2C
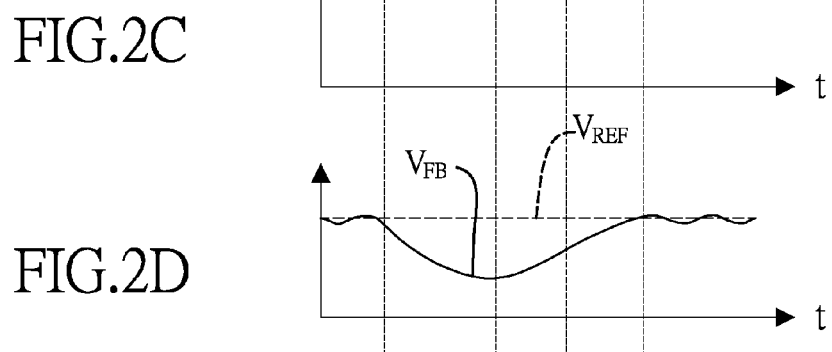
FIG.2D
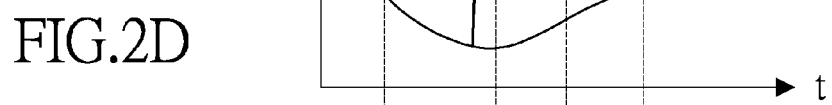
FIG.2E
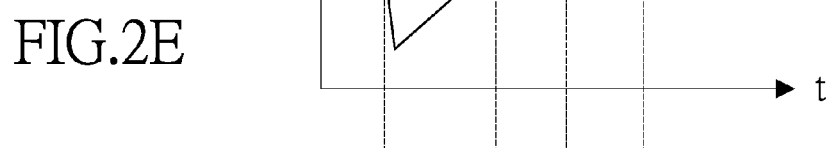
FIG.2F
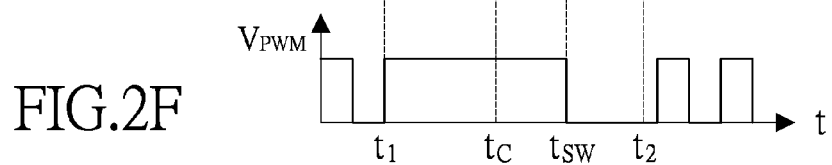

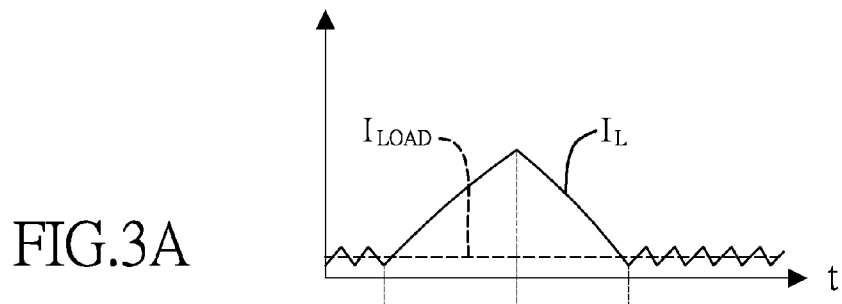
FIG.3A
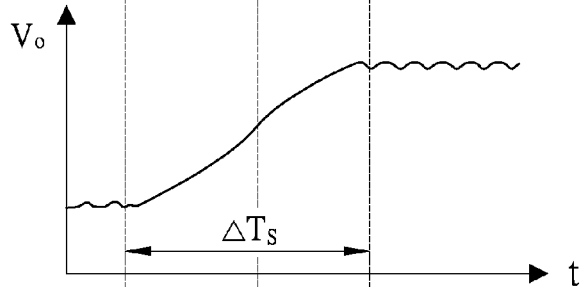
FIG.3B
FIG.3C
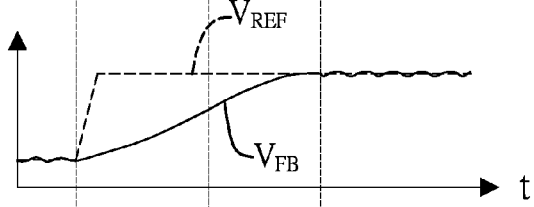
FIG.3D
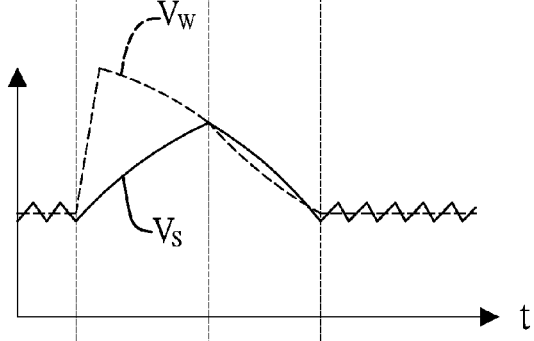
FIG.3E
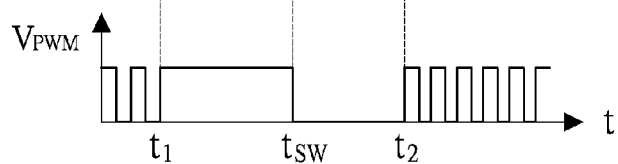
FIG.3F

BUCK CONVERTER WITH A VARIABLE-GAIN FEEDBACK CIRCUIT FOR TRANSIENT RESPONSES OPTIMIZATION

BACKGROUND

1. Technical Field

The present disclosure relates generally to a buck converter, and more particularly to a buck converter with a variable-gain feedback circuit for transient responses optimization.

2. Description of Related Art

Switching buck converters are widely used as voltage regulators in battery-powered portable devices to achieve high power-conversion efficiency. FIG. 10 shows a block diagram of a conventional buck converter which includes a power stage and a controller. Also, FIG. 11A and FIG. 11B are schematic circuit diagrams respectively showing operations of a high-side ON state and a low-side ON state in FIG. 10. The synchronous topology of the buck converter has two switches, one is referred to as the high-side switch $S_H$ and the other is referred to as the low-side switch $S_L$.

The controller mainly has an error amplifier with compensation components 21, a pulse width modulation (PWM) generator 22, and a driver 23. The error amplifier with compensation components 21 receives a reference voltage $V_{REF}$ and a feedback voltage $V_{FB}$ to generate an error voltage. The feedback voltage $V_{FB}$ is obtained by dividing the output voltage $V_O$ by resistors $R_{O1}, R_{O2}$. The PWM generator 22 receives the error voltage and a voltage, which may be a sawtooth signal, a sensed inductor current $I_L$ or the output voltage $V_O$, to generate a PWM signal to control the high-side switch $S_H$ and the low-side switch $S_L$. Accordingly, in steady state conditions, this cycle of turning the high-side and low-side switches $S_H, S_L$ ON and OFF complimentary to each other regulates the output voltage $V_O$ to its targeted value.

As shown in FIGS. 12A-12B, the inductor current $I_L$ is increased when the high-side switch $S_H$ is turned on; on the contrary, the inductor current $I_L$ is decreased when the low-side switch $S_L$ is turned on.

To integrate more multi-functional system-on-chip (SOC) applications into battery-powered portable devices, buck converters should provide a regulated voltage despite large and frequently varying load current. In addition, to reduce the power consumption of digital systems, buck converters should also offer an adjustable output voltage for realizing dynamic voltage scaling (DVS). However, if the transient responses of the buck converters are slow, a large output voltage undershoot/overshoot or a long settling time will occur, resulting in reduced reliability of the systems or degraded signal-to-noise ratio (SNR) performance of noise-sensitive circuits. These problems can be alleviated by a buck converter that simultaneously achieves both fast load transient response and fast DVS transient response.

To improve the power stage for achieving fast transient responses, asynchronous low dropout regulator (LDO) or a power switch can be connected in parallel with the buck converter to bypass the output inductor $L_O$ and prevent the transient response from being limited by the charging slope of the output inductor current $I_L$. However, the chip area and power consumption will increase.

To improve the controller for achieving fast load transient response, a feed-forward path in $V^2$-based controls can deliver the output voltage directly to the PWM generator 22 and bypass the error amplifier with compensation components 21, which limits transient responses. The adaptive pole-zero position technique can reconfigure the error amplifier with compensation components 21 to extend the loop bandwidth during load transient. In addition, for achieving fast DVS transient response, the end-point prediction (EPP) technique can predict the output voltage of the error amplifier with compensation components 21 to accelerate the transient response. However, the aforementioned techniques for improving the controller can only achieve either fast load transient or fast DVS transient response.

SUMMARY

Accordingly, a buck converter with a variable-gain feedback circuit for transient responses optimization is provided to attempt to resolve the above-mentioned disadvantages. The buck converter with a variable-gain feedback circuit for transient responses optimization includes a power stage circuit and a control circuit. The power stage circuit with an input side and an output side has a pair of switches and an output capacitor. The switches are electrically connected at the input side. The output capacitor is electrically connected at the output side.

The control circuit has a current-sensing unit, an error-amplifying and transient-holding unit, a transient-optimized feedback unit, and a PWM generation unit. The current-sensing unit senses an output capacitor current flowing through the output capacitor and converts the output capacitor current into a converting signal. The error-amplifying and transient-holding unit receives a feedback voltage at the output side and a reference voltage to generate an error signal. The transient-optimized feedback unit receives the feedback voltage and the reference voltage to convert the voltage difference into a proportional voltage signal by a variable gain value.

The PWM generation unit receives the proportional voltage signal and a sensing voltage signal obtained by adding the converting signal and the error signal to generate a PWM signal to control the switches. When the proportional voltage signal is equal to the sensing voltage signal, the switches are controlled by the PWM signal to start charging and discharging the output capacitor.

The buck converter is substantially a capacitor-current-controlled hysteretic buck converter, which is implemented to simultaneously optimize both a load transient response and a DVS transient response with insignificant increase of chip area and power consumption. Also, the optimized load transient response and DVS transient response are implemented for minimizing both output voltage undershoot/overshoot and settling time in the buck converter.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

FIGS. 2A-2F are corresponding current and voltage waveforms in load transient response of the buck converter according to the present disclosure;

FIGS. 3A-3F are corresponding current and voltage waveforms in DVS transient response according to the present disclosure;

DETAILED DESCRIPTION OF PREFERRED EMBODIMENT

Figure 1:
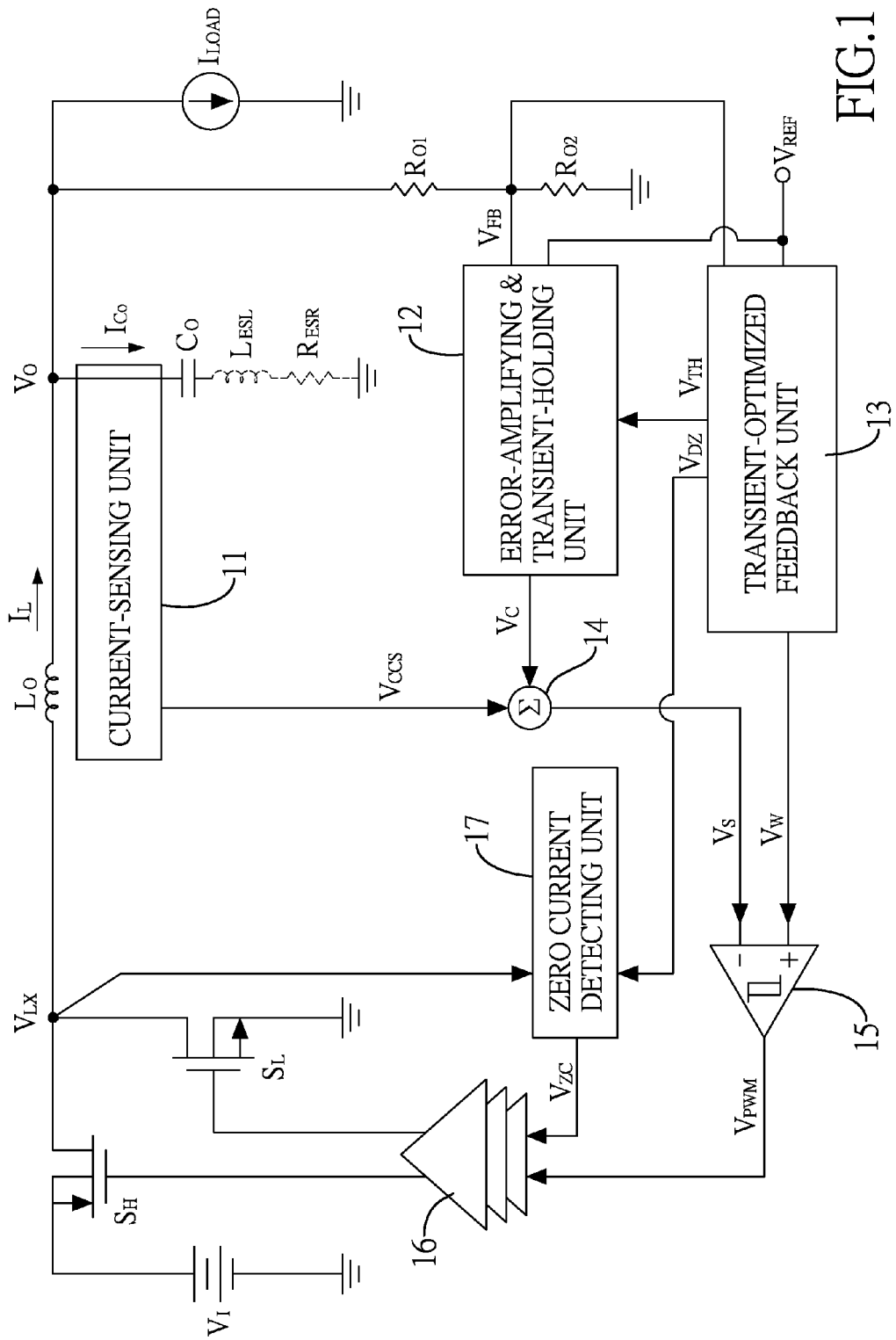
FIG. 1 is a block circuit diagram of a buck converter with a variable-gain feedback circuit for transient responses optimization according to the present disclosure.

Reference will now be made to the drawing figures to describe the present disclosure in detail.

FIG. 1 shows a buck converter with a variable-gain feedback circuit for transient responses optimization. The buck converter includes a power stage circuit and a control circuit. The power stage circuit with an input side and an output side includes a pair of switches $S_H, S_L$, an output capacitor $C_O$, and an output inductor $L_O$. The switches $S_H, S_L$ include a high-side switch $S_H$ and a low-side switch $S_L$, both are electrically connected to an input voltage $V_I$, which is a direct current (DC) voltage at the input side. In this example, the high-side switch $S_H$ is, but not limited to, a P-type MOSFET switch and the low-side switch $S_L$ is, but not limited to, an N-type MOSFET switch.

The output capacitor $C_O$ is electrically connected between the output side and a ground. In particular, the output capacitor $C_O$ is modeled with its parasitic inductance $L_{ESL}$ and parasitic resistance $R_{ESR}$. The output inductor $L_O$ is electrically connected between the switches $S_H, S_L$ and the output capacitor $C_O$ at the output side.

In the present disclosure, the buck converter is substantially a capacitor-current-controlled hysteretic buck converter, which is implemented to optimize both a load transient response and a DVS transient response with insignificant increase of chip area and power consumption.

The control circuit includes a current-sensing unit 11, an error-amplifying and transient-holding unit 12, a transient-optimized feedback unit 13, a calculation unit 14, a PWM generation unit 15, a driving unit 16, and a zero current detecting unit (ZCD) 17.

The current-sensing unit 11 senses an output capacitor current $I_{Co}$ flowing through the output capacitor $C_O$ and converts the output capacitor current $I_{Co}$ into a converting voltage signal $V_{CCS}$. The error-amplifying and transient-holding unit 12 receives a feedback voltage $V_{FB}$ at the output side and a reference voltage $V_{REF}$ to output an error voltage signal $V_C$. The transient-optimized feedback unit 13 receives the feedback voltage $V_{FB}$ and the reference voltage $V_{REF}$ to output a proportional voltage signal $V_W$. The calculation unit 14 receives the converting voltage signal $V_{CCS}$ and the error voltage signal $V_C$ to generate a sensing voltage signal $V_S$. The PWM generation unit 15 receives the proportional voltage signal $V_W$ and the sensing voltage signal $V_S$ to generate a PWM signal $V_{PWM}$ to control the switches $S_H, S_L$.

The zero current detecting unit 17 receives a ZCD-disabling signal $V_{DZ}$ generated from the transient-optimized feedback unit 13 and an inductor input voltage $V_{LX}$ at the input side to generate a zero current output signal $V_{ZC}$. The driving unit 16 may drive the switches $S_H, S_L$ based on the PWM signal $V_{PWM}$. Alternatively, the driving unit 16 may further drive the switches $S_H, S_L$ based on both the zero current output signal $V_{ZC}$ and the PWM signal $V_{PWM}$.

The detailed operation of the buck converter with a variable-gain feedback circuit for transient responses optimization will be described hereinafter as follows.

FIGS. 2A-2F show corresponding current and voltage waveforms in load transient response of the buck converter, where $I_{LOAD}$ is the load current, $I_L$ is the output inductor current, $I_{Co}$ is the output capacitor current, $V_O$ is the output voltage, $V_{REF}$ is the reference voltage, $V_{FB}$ is the feedback voltage, $V_W$ is the proportional voltage signal, $V_S$ is the sensing voltage signal, and $V_{PWM}$ is the PWM signal. As shown in FIG. 2A, the output inductor current $I_L$ should start charging instantly when the load transient starts at a first time point $t_1$, and continue charging until the output inductor current $I_L$ exceeds the load current $I_{LOAD}$ to minimize a first electric charge $Q_1$, which is defined as the decreased electric charge stored in the output capacitor $C_O$ before the output inductor current $I_L$ equals the load current $I_{LOAD}$ at a zero-crossing time point $t_C$, resulting in a minimized output voltage undershoot $\Delta V_{OU}$ shown in FIG. 2C. Moreover, if the output inductor current $I_L$ starts discharging at an optimal time point $t_{SW}$ to ensure that a second electric charge $Q_2$ equals the minimized first electric charge $Q_1$, resulting in a minimized settling time $\Delta T_S$ shown in FIG. 2C. The second electric charge $Q_2$ is defined as the excess electric charge stored in the output capacitor $C_O$ before the next switching activity of the power stage. On the contrary, if the output inductor current $I_L$ starts discharging too late or too early, the settling time $\Delta T_S$ will be longer.

FIGS. 3A-3F show corresponding current and voltage waveforms in DVS transient response of the buck converter. Similarly, the optimized up-tracking DVS transient response shown in FIG. 3A ensures that the output inductor current $I_L$ starts charging instantly at the first time point $t_1$, and starts discharging at the optimal time point $t_{SW}$. Therefore, a minimized settling time $\Delta T_S$ and negligible overshoot are achieved as shown in FIG. 3C. On the contrary, if the output inductor current $I_L$ starts discharging too late or too early, the settling time $\Delta T_S$ will be longer and the overshoot is larger.

Figure 4:
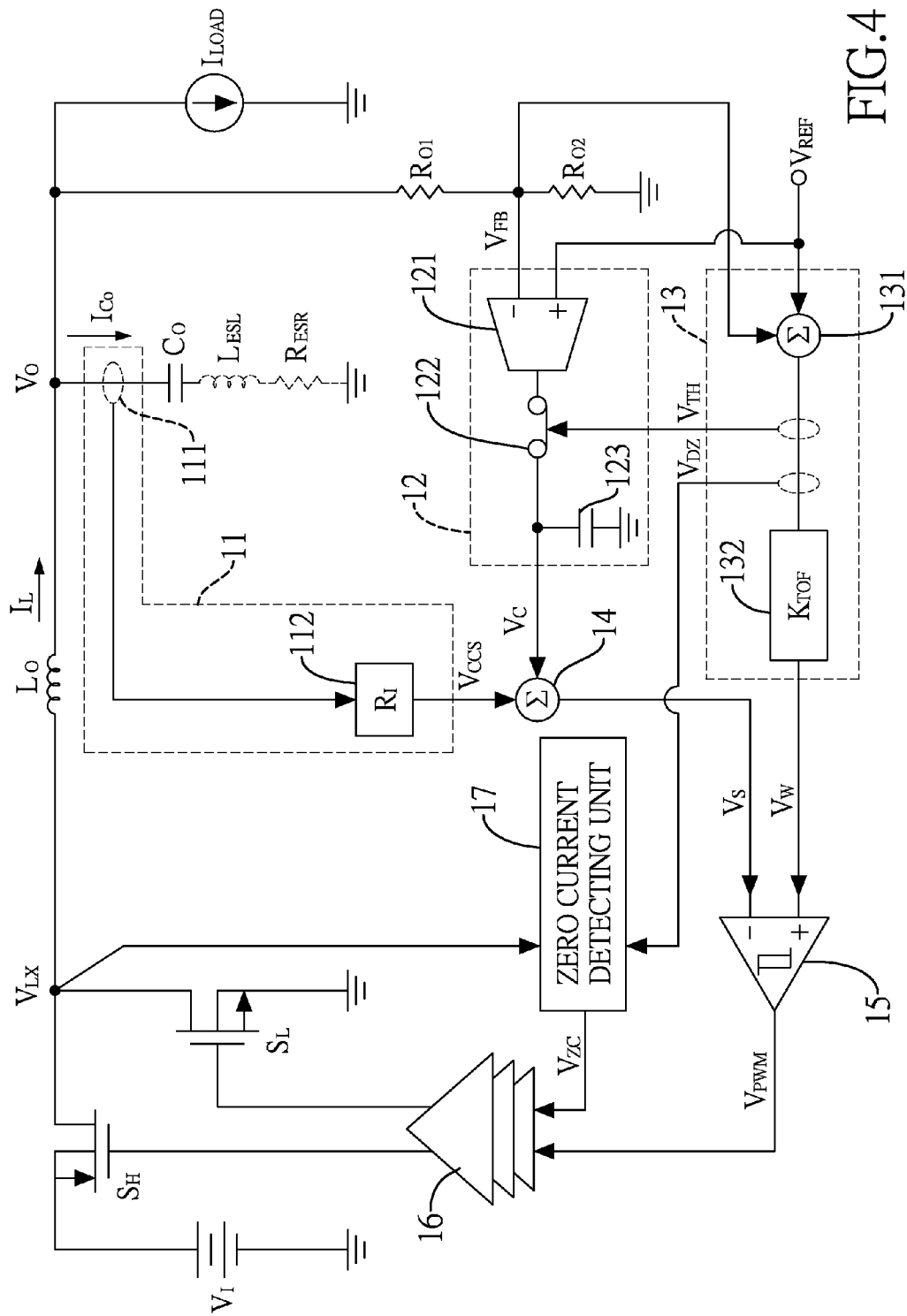
FIG. 4 is a detailed block circuit diagram in FIG. 1.

FIG. 4 shows a detailed block circuit diagram of FIG. 1. The buck converter is substantially a hysteretic buck converter. The output capacitor $C_O$ is modeled with its parasitic inductance $L_{ESL}$ and parasitic resistance $R_{ESR}$. The current-sensing unit 11 includes a current sensor 111 and a resistor 112 with a resistance value $R_I$. The current sensor 111 senses the output capacitor current $I_{Co}$ and then the resistor 112 converts the output capacitor current $I_{Co}$ into the converting voltage signal $V_{CCS}$. More specifically, the converting voltage signal $V_{CCS}$ is converted by multiplying the output capacitor current $I_{Co}$ by the resistance value $R_I$ of the resistor 112. Thus, the converting voltage signal $V_{CCS}$ can be expressed as:

$$V_{CCS}(t)=R_I \times I_{Co}(t) \qquad (1)$$

The transient-optimized feedback unit 13 includes a voltage difference sensing unit 131 and a variable gain amplifier 132. The voltage difference sensing unit 131 receives the feedback voltage $V_{FB}$ and the reference voltage $V_{REF}$ and generates a voltage difference between the feedback voltage $V_{FB}$ and the reference voltage $V_{REF}$, and then the voltage difference is multiplied by a variable gain value $K_{TOF}$ of the variable gain amplifier 132 to generate the proportional voltage signal $V_W$. In addition, the transient-optimized feedback unit 13 further generates a transient detection signal $V_{TH}$ and a ZCD-disabling signal $V_{DZ}$, described in detail later.

The error-amplifying and transient-holding unit 12 includes an error amplifier 121, a switch 122, and a compensation capacitor 123. The error amplifier 121 receives the feedback voltage $V_{FB}$ and the reference voltage $V_{REF}$ and integrates an error of the output voltage $V_O$ to adjust the error voltage signal $V_C$ outputted from the error amplifier 121. In particular, the switch 122 provided between the error amplifier 121 and the compensation capacitor 123 is dynamically activated by the transient detection signal $V_{TH}$ generated from a transient detection unit of the transient-optimized feedback unit 13.

Accordingly, by respectively using the current-sensing unit 11 and transient-optimized feedback unit 13, the load transient and DVS transient information bypasses the error-amplifying and transient-holding unit 12 and affects the PWM signal $V_{PWM}$ through the PWM generation unit 15, which is substantially a hysteretic comparator, resulting in an instant response of the output inductor current $I_L$. Especially, both load transient response and DVS transient response are not limited by the error-amplifying and transient-holding unit 12 since the error voltage signal $V_C$ does not need to change when the load current $I_{LOAD}$ or the reference voltage $V_{REF}$ changes.

The similarities between the detailed waveforms of both optimized responses are examined to simultaneously optimize load transient response and DVS transient response. As mentioned above, the converting voltage signal $V_{CCS}$ is subtracted by the error voltage signal $V_C$ to obtain the sensing voltage signal $V_S$, namely $V_S(t)=V_{CCS}(t)-V_C(t)$ since the error voltage signal $V_C$ is obtained from a negative feedback path through the error-amplifying and transient-holding unit 12. However, the error voltage signal $V_C$ outputted from the error amplifier 121 will remain unchanged during transients by the switch 122 and the compensation capacitor 123.

More specifically, the purpose of the error amplifier 121 is to integrate the error of the output voltage $V_O$ in the steady-state period to adjust the error voltage signal $V_C$ outputted from the error amplifier 121 for a more accurate output voltage $V_O$. However, the error amplifier 121 also integrates the error of the output voltage $V_O$ in the transient period, resulting in an unnecessary change of the error voltage signal $V_C$. The change of the error voltage signal $V_C$ affects the transient response optimization of the transient-optimized feedback unit 13 since the sensing voltage signal $V_S$ does not proportionally change with the output capacitor current $I_{C_O}$. This effect of change of the error voltage signal $V_C$ is large for a large DVS transient, resulting in a large output voltage overshoot and a longer settling time.

Although increasing the compensation capacitor 123 can reduce the change of the error voltage signal $V_C$ during transients, the chip area and costs increase. As mentioned above, the transient detection signal $V_{TH}$, which is generated by the transient-optimized feedback unit 13, pulls high when a large transient is detected. Accordingly, the transient detection signal $V_{TH}$ opens the switch 122 during a large transient to disconnect the error amplifier 121 from the compensation capacitor 123 so that the change of the error voltage signal $V_C$ is greatly reduced without increasing the compensation capacitor 123. Therefore, the sensing voltage signal $V_S$ will proportionally change with the output capacitor current $I_{C_O}$ during transients according to equation (1).

When load transient or DVS transient starts at the first time point $t_1$, the output inductor current $I_L$ starts charging the output capacitor $C_O$, resulting in an increasing sensing voltage signal $V_S$. Also, the sensing voltage signal $V_S$ continues increasing until it equals the $V_W$ generated by the transient-optimized feedback unit 13. The PWM generation unit 15, namely the hysteretic comparator will control the PWM signal $V_{PWM}$ to ensure that the output inductor current $I_L$ starts discharging at the optimal time point $t_{SW}$ to settle the output voltage $V_O$ to its targeted value at the second time point $t_2$. The relationship between all waveforms in load transient response shown in FIGS. 2A-2F is identical to that in DVS transient response shown in FIGS. 3A-3F from the optimal time point $t_{SW}$ to the second time point $t_2$. Accordingly, the excess electric charge $Q_{C_O}$ of the output capacitor $C_O$ from the optimal time point $t_{SW}$ to the second time point $t_2$ is derived as:

$$Q_{Co} = \frac{I_{Co}(t_{SW})}{2} \times (t_2 - t_{SW}) = \frac{I_{Co}(t_{SW})}{2} \times \frac{I_{Co}(t_{SW})}{m_f} \qquad (2)$$

Since the change in the output inductor current $I_L$ and the output capacitor current $I_{C_O}$ are identical from the optimal time point $t_{SW}$ to the second time point $t_2$, $m_f$ is the falling slope of the output inductor current $I_L$, resulting in $$mf = \frac{\overline{V_O}}{L_O},$$

where $\overline{V_O}$ is the average of the output voltage $V_O$ from the optimal time point $t_{SW}$ to the second time point $t_2$. Thus, $$Q_{Co} = \frac{L_O}{2\overline{V_O}} \times I_{Co}^2(t_{SW}) \qquad (3)$$

Since the optimized response ensures that the output voltage $V_O$ settles to its targeted value at the second time point $t_2$, the increased voltage of the output voltage $V_O$ from the optimal time point $t_{SW}$ to the second time point $t_2$ can be expressed as:

$$V_O(t_2) - V_O(t_{SW}) = \frac{Q_{Co}}{C_O} - R_{ESR} \times I_{Co}(t_{SW}) \qquad (4)$$

where the first term on the right side of equation (4) is the voltage change due to the excess electric charge $Q_{C_O}$ stored in the output capacitor $C_O$, while the second term on the right side of equation (4) is the voltage across the parasitic resistance $R_{ESR}$ due to the output capacitor current $I_{C_O}$ at the optimal time point $t_{SW}$. By combining equations (1), (3), and (4), the optimized response should ensure $$V_S(t_{SW}) = R_I \times \frac{R_{ESR} + \sqrt{R_{ESR}^2 + \frac{2L_O}{\beta V_O C_O}[V_{FB}(t_2) - V_{FB}(t_{SW})]}}{\frac{L_O}{V_O C_O}} \quad (5)$$

where β is the ratio of the feedback voltage $V_{FB}(t)$ to the output voltage $V_O(t)$. As depicted in FIGS. 2A-2F and FIGS. 3A-3F, a condition of $V_{FB}(t_2)=V_{REF}(t_{SW})$ will be satisfied in both load transient response and DVS transient response so that $V_{REF}(t_{SW})$ can replace $V_{FB}(t_2)$ in equation (5).

Therefore, if the transient-optimized feedback unit 13 can be designed to generate the proportional voltage signal $V_W$ as $$V_W(t) = R_I \times \frac{R_{ESR} + \sqrt{R_{ESR}^2 + \frac{2L_O}{\beta V_O C_O}[V_{REF}(t) - V_{FB}(t)]}}{\frac{L_O}{V_O C_O}}, \quad (6)$$

and then when the PWM generation unit 15 detects that the proportional voltage signal $V_W$ equals the sensing voltage signal $V_S$ at the optimal time point $t_{SW}$, equation (5) will be guaranteed. In other words, if the transient-optimized feedback unit 13 can convert $V_{REF}(t)-V_{FB}(t)$ into $V_W(t)$ according to equation (6), the optimized load transient response and DVS transient response can be simultaneously achieved. The analysis for heavy-to-light load transient response and down-tracking DVS transient response can be similarly derived by replacing $m_f$ in equation (2) with the rising slope of the current ripple $m_r$ which is $$\frac{V_I - V_O}{L_O}.$$

By individually examining both load transient response and DVS transient response above, it is found that the key to transient optimization is the relationship between the output capacitor $C_O$ and the required excess electric charge $Q_{Co}$. Therefore, regardless of whether the load transient or/and DVS transient occur(s) alone or simultaneously, the transient response can be optimized by the control circuit of the present disclosure.

Figure 5:
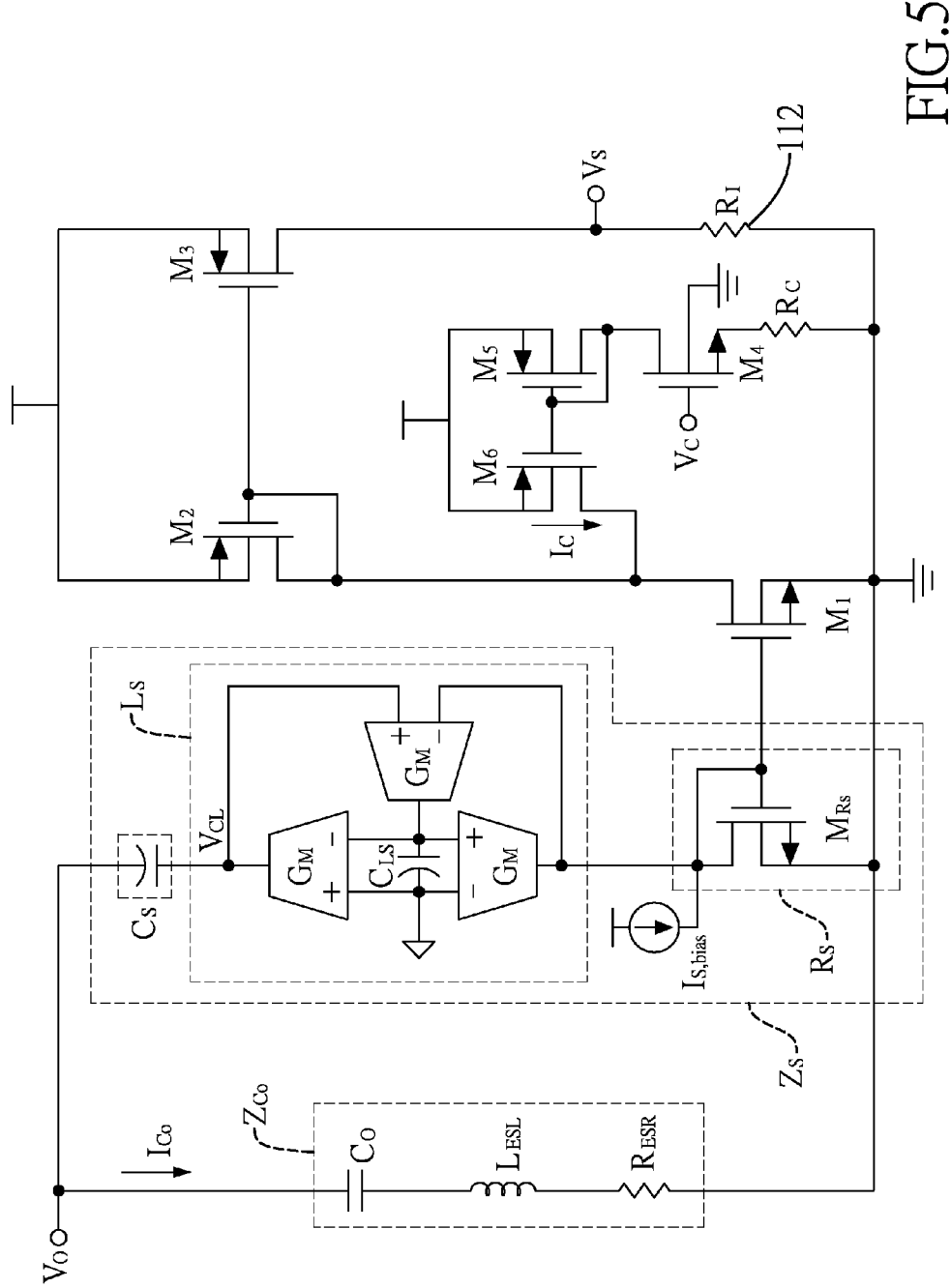
FIG. 5 is a block circuit diagram of a current-sensing unit according to the present disclosure.

FIG. 5 shows the circuit implementation of the current-sensing unit 11. The current-sensing unit 11 connected in parallel with the output capacitor $C_O$ is implemented by a poly-insulator-poly (PIP) capacitor whose bottom plate is connected to the output voltage $V_O$ since the equivalent impedance is less sensitive to the parasitic capacitance at the output voltage $V_O$ than at the voltage $V_{CL}$. An inductor $L_S$ is an active inductor and designed as $L_S=C_{LS}/G^2_M$, while $R_S$ is implemented as the diode-connected transistor $M_{Rs}$, where $R_S=1/G_M R_S$. $M_{Rs}$ is biased by the current source $I_{S,bias}$ to allow negative output capacitor current $I_{Co}$ sensing. The sensed capacitor current flows into a resistor $R_I$ by current mirrors $M_1$ to $M_3$. $C_S$, $L_S$, and $R_S$ are series-connected to implement $Z_S$, which is a scaled replica impedance of the output capacitor $Z_{Co}$.

Figure 6:
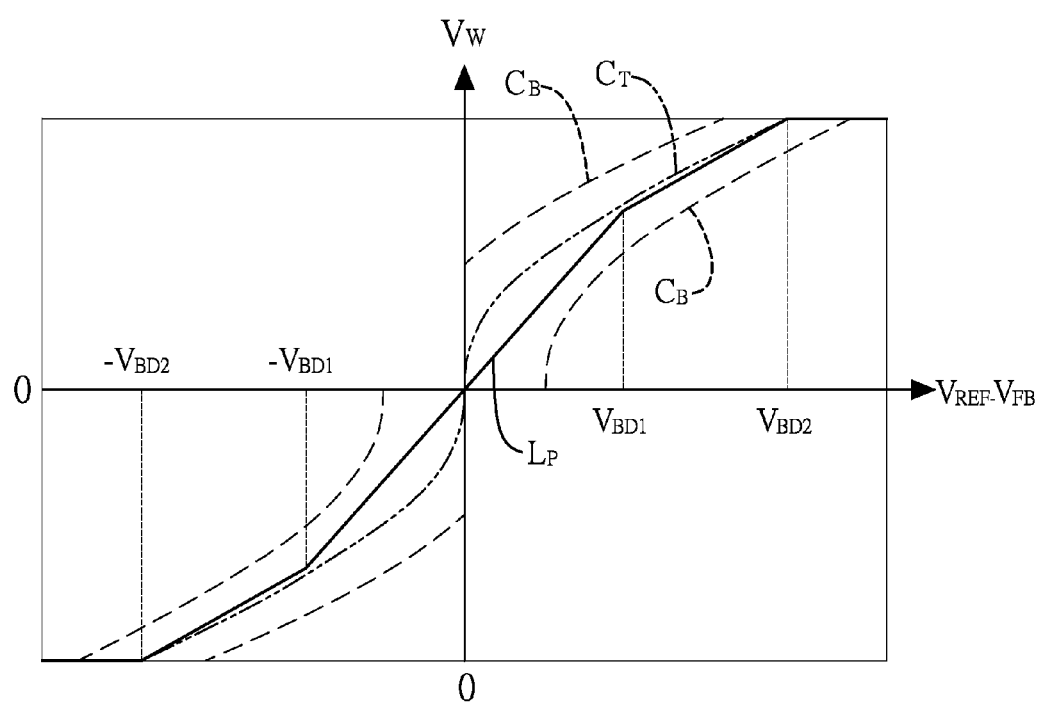
FIG. 6 is a diagram showing voltage relation curves and lines according to the present disclosure.

FIG. 6 shows the theoretical transfer curve $C_T$ of $V_W(t)$ versus $V_{REF}(t)-V_{FB}(t)$ as expressed in equation (6). If $V_W(t)$ is generated according to its theoretical transfer function as expressed in equation (6), the output voltage $V_O$ settling exactly to the targeted value at the second time point $t_2$ is guaranteed, as shown in FIGS. 2A-2F and FIGS. 3A-3F. However, according to a commonly-used definition, if the error of the output voltage $V_O$ is within ±1% of the targeted value, it is regarded as being settled. Therefore, by replacing $V_O(t_2)$ with $V_O(t_2)\times(1\pm1\%)$ in equation (4), the boundaries between an acceptable and unacceptable $V_W(t)$ transfer function in terms of $V_{REF}(t)-V_{FB}(t)$ can be derived. After plotting the boundaries with the boundary curves $C_B$, including an upper boundary curve and a lower boundary curve, an optimal region and a non-optimal region of $V_W(t)$ versus $V_{REF}(t)-V_{FB}(t)$ can be obtained. In particular, a region between the boundary curves shown in the first quadrant and the third quadrant is the optimal region; and a region out of the boundary curves is the non-optimal region. A non-linear input-to-output transfer function of the transient-optimized feedback unit 13 is required to ensure that proportional voltage signal $V_W$ falls in the optimal region over a wide range of the voltage differences between the reference voltage $V_{REF}$ and the feedback voltage $V_{FB}$, namely $V_{REF}-V_{FB}$. To avoid a complicated circuit for implementing a square root function, the transient-optimized feedback unit 13 realizes a piecewise linear transfer function, depicted as the piecewise lines $L_P$.

Figure 7:
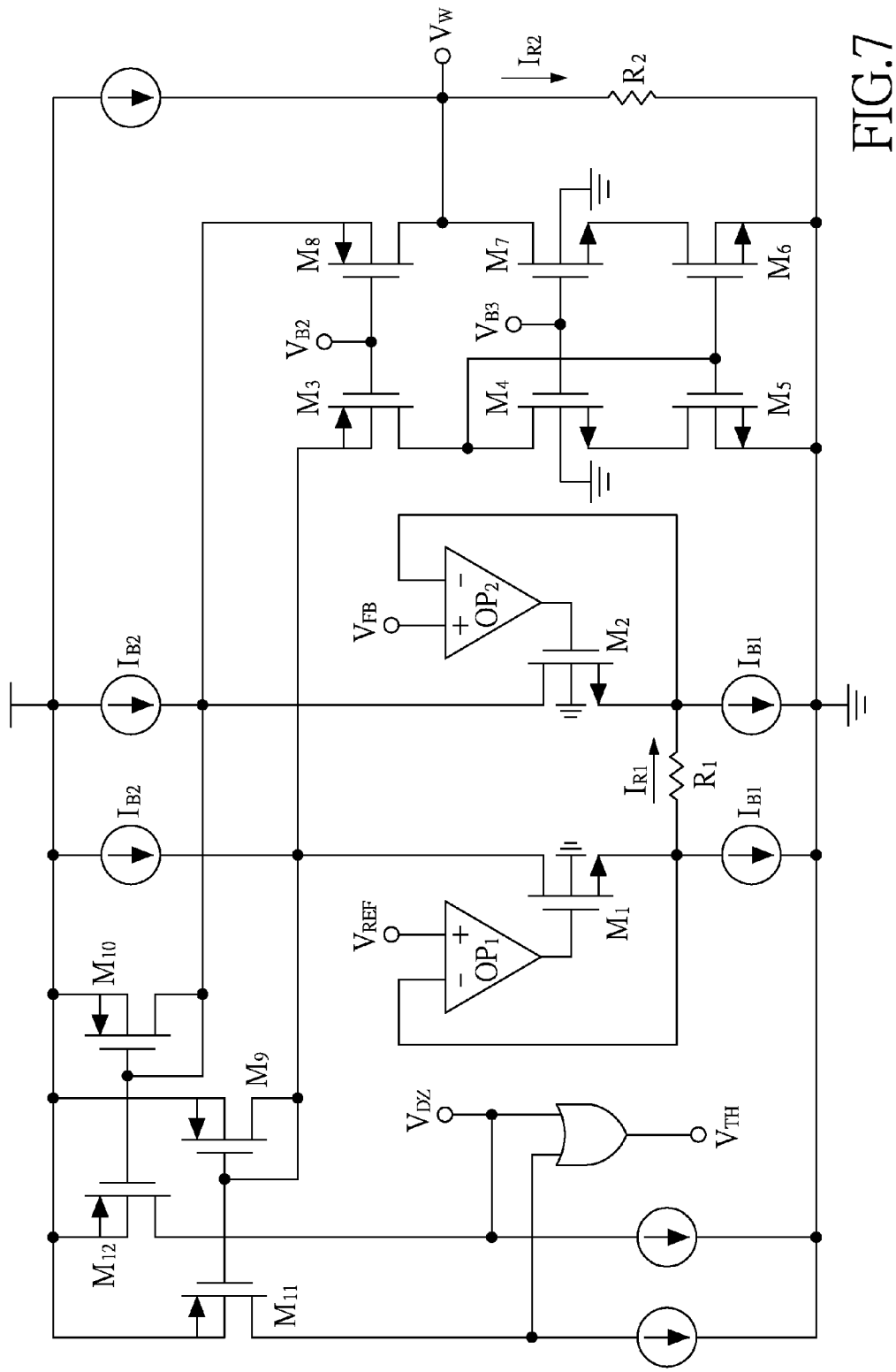
FIG. 7 is a block circuit diagram of a transient-optimized feedback unit according to the present disclosure.

FIG. 7 shows the circuit implementation of the transient-optimized feedback unit 13, which operates in three different states according to three different ranges of $|V_{REF}-V_{FB}|$. In state 1, $V_{REF}-V_{FB}|$ is small, and $M_9$ to $M_{10}$ are designed to turn off. As such, the transient-optimized feedback unit 13 operates as a folded-cascode operational amplifier, and the cascade branches, comprising $M_3$ to $M_8$, are biased at $(I_{B2}-I_{B1})$. $OP_1$ and $OP_2$ fix the voltage across to R1 to $(V_{REF}-V_{FB})$, which is then converted to current $I_{R1}$, where $I_{R1}=(V_{REF}-V_{FB})/R_1$. The output current $I_{R2}=2\times I_{R1}$ so that the input-to-output voltage gain of the transient-optimized feedback unit 13 is $2\times(R_2/R_1)$.

By designing $I_{B1}<I_{B2}<2\times I_{B1}$, the transient-optimized feedback unit 13 operates in state 2 when $|V_{REF}-V_{FB}|$ exceeds the boundary voltage $V_{BD1}$ shown in FIG. 6, where $V_{BD1}=(I_{B2}-I_{B1})\times R_1$. Since $I_{R1}$ is larger than $(I_{B2}-I_{B1})$ in state 2, no bias current flows through the left-half cascode branch, comprised of $M_3$ to $M_5$. As a result, $I_{R1}$ only flows through $M_2$ and $M_8$ to output; therefore, $I_{R2}=I_{R1}$, and the input-to-output voltage gain of the transient-optimized feedback unit 13 is only $(R_2/R_1)$. In addition, since $I_{R1}$ is larger than $(I_{B2}-I_{B1})$ in state 2, both $M_9$ and $M_{11}$ are forced to turn on, pulling the transient detection signal $V_{TH}$ high. The transient detection signal $V_{TH}$ enables the transient hold technique to decide if the error amplifier 121 should be disconnected from the compensation capacitor 123. For design simplicity, the threshold voltage of the transient hold technique is the same as $V_{BD1}$.

If $|V_{REF}-V_{FB}|>V_{BD2}$, where $V_{BD2}=I_{B1}\times R_1$, $I_{R1}$ is larger than $I_{B1}$, the excess current will increase the source voltage of $M_2$ so that the gate-source voltage of $M_2$ decreases, and finally $M_2$ turns off. Accordingly, the transient-optimized feedback unit 13 is now operating in state 3. As a result, both branches of the folded-cascode operational amplifier are disabled, so $I_{R2}$ is independent of $(V_{REF}-V_{FB})$, resulting in a flat curve shown in FIG. 6.

To disable the zero current detecting unit 17 during the heavy-to-light load-transient or down-tracking DVS transient period, the transient-optimized feedback unit 13 also generates a ZCD-disabling signal $V_{DZ}$ by a method similar to generating the transient detection signal $V_{TH}$, except that the ZCD-disabling signal $V_{DZ}$ pulls high only when $(V_{FB}-V_{REF})>V_{BD1}$ instead of $(V_{REF}-V_{FB})>V_{BD1}$.

In practical implementation, the equivalent $C_O$, $R_{ESR}$, and $L_{ESL}$ shown in FIG. 4 vary with time, different operating output voltages $V_O$ and PCB layout. According to the theoretical transfer function of equation (6), the variations of the equivalent $C_O$ and $R_{ESR}$ affect the optimal region depicted in FIG. 6.

Figure 8:
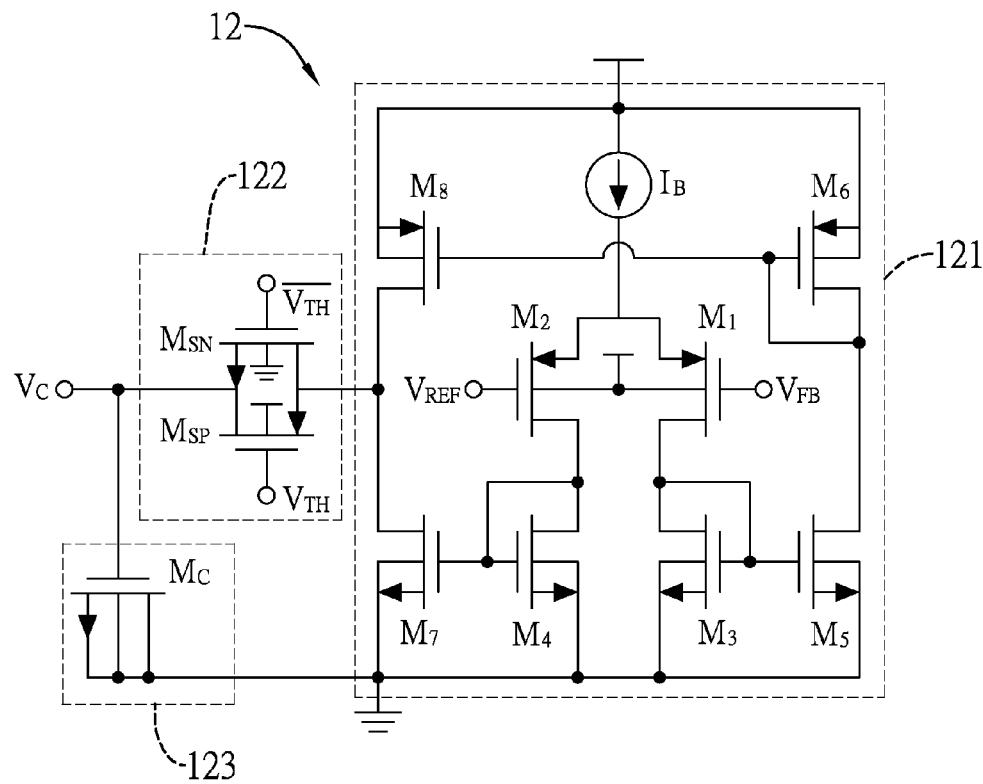
FIG. 8 is a block circuit diagram of an error-amplifying and transient-holding unit according to the present disclosure.

FIG. 8 shows the circuit implementation of the error-amplifying and transient-holding unit 12, namely the error amplifier 121 with the transient hold technique. The error amplifier 121 is composed of $M_1$ to $M_8$, and $I_B$, and since the error voltage signal $V_C$ does not need to change when $I_{LOAD}$ or $V_{REF}$ changes, the requirement of the bandwidth of the error amplifier 121 is relaxed. Therefore, the power consumption of the error amplifier 121 is much smaller than that of a conventional one. When the transient detection signal $V_{TH}$ is high, the switch 122, implemented by the transmission gates $M_{SN}$ and $M_{SP}$, disconnects the error amplifier 121 to hold the error voltage signal $V_C$. In addition, the compensation capacitor 123 is implemented as a MOS capacitor $M_C$.

For different patterns of $V_{REF}(t)-V_{FB}(t)$, the exact error voltage signal $V_C$ changes after the switch $S_{TH}$ opens are different due to the sampling error of the aperture jitter effect. However, for fast DVS transients with slopes larger than 0.2 V/μs, the maximum value of the change of the error voltage signal $V_C$ is less than 5 mV, which is insignificant compared with $V_W$ shown in FIG. 6. For load transients or slower DVS transients, $V_{REF}(t)-V_{FB}(t)$ are small, resulting in a negligible change of the error voltage signal $V_C$.

Figure 9:
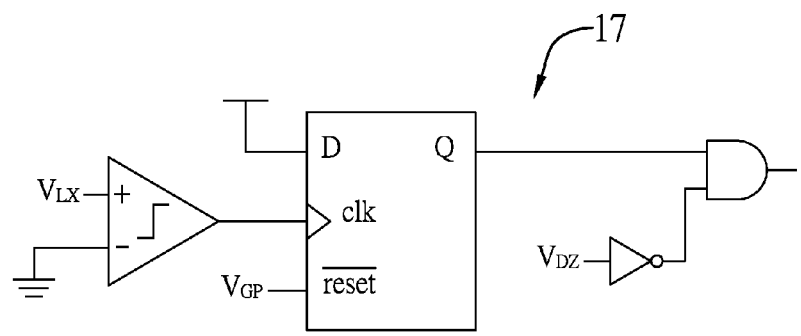
FIG. 9 is a block circuit diagram of a zero current detecting unit according to the present disclosure.
Figure 10:
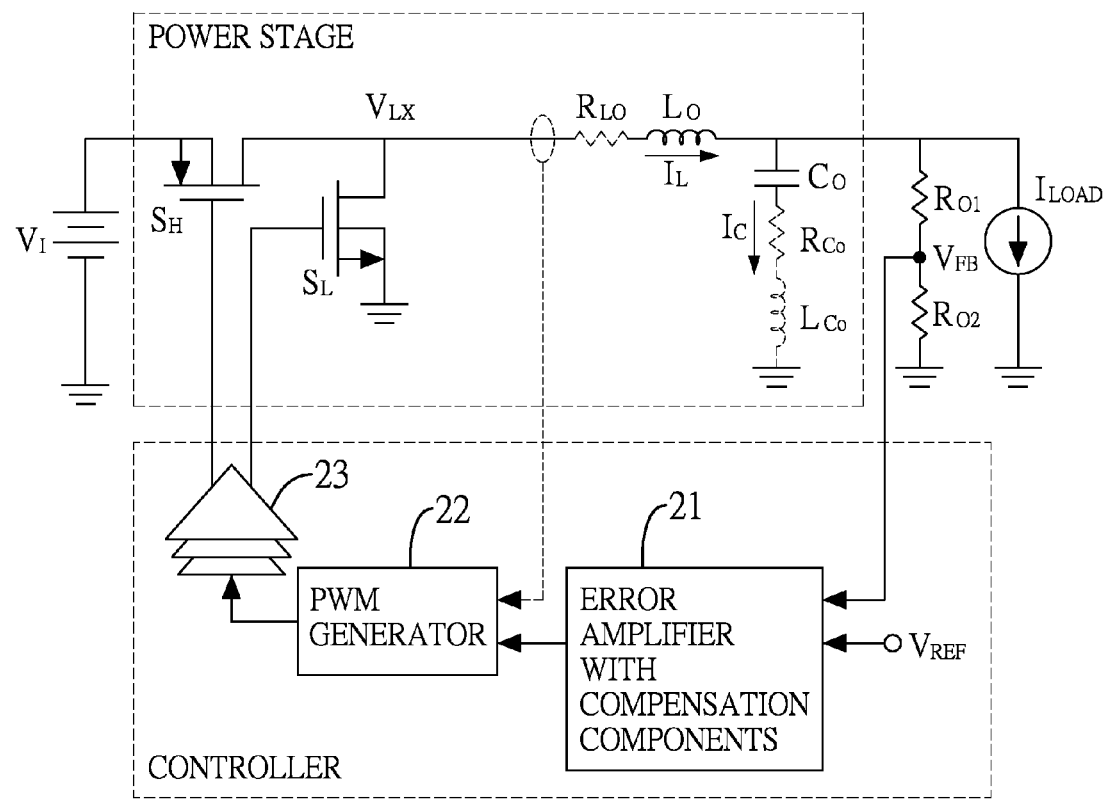
FIG. 10 is a block diagram of a conventional buck converter.
Figure 11A:
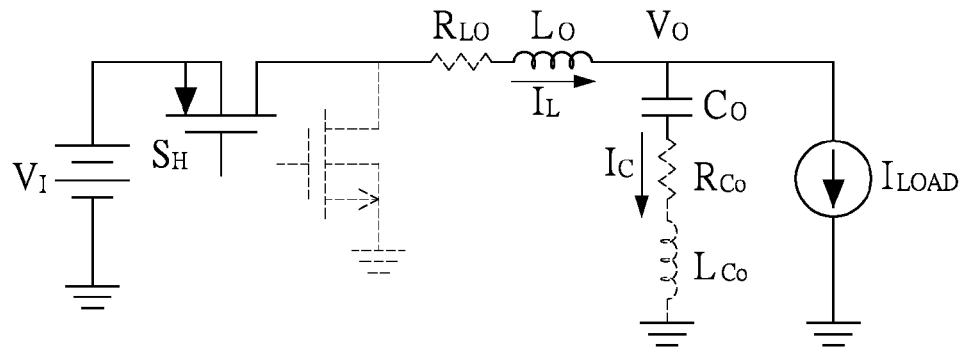
FIG. 11A is a schematic circuit diagram showing one operation of a high-side ON state in FIG. 10.
Figure 11B:
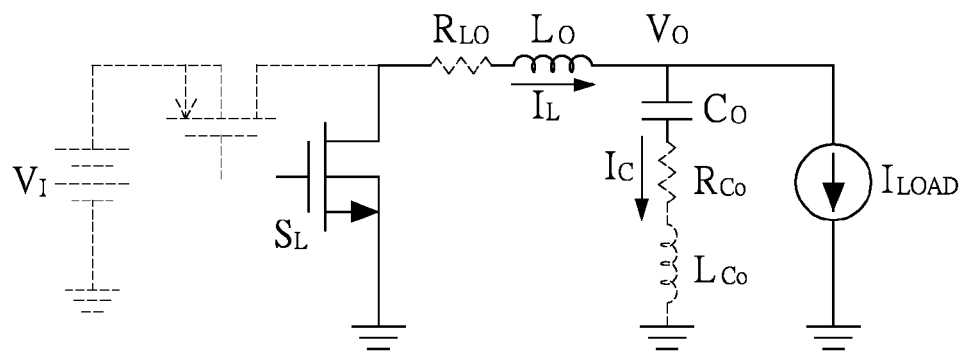
FIG. 11B is a schematic circuit diagram showing the other operation of a low-side ON state in FIG. 10.
Figure 12A:
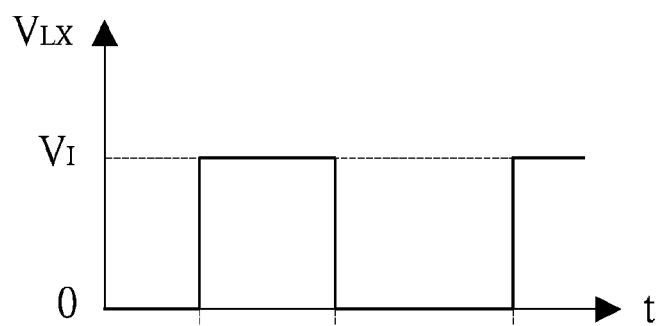
FIGS. 12A-12B are voltage and current waveforms in FIG. 10.
Figure 12B:
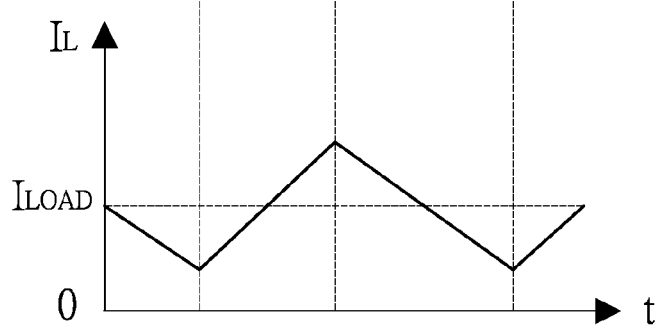

FIG. 9 shows the circuit implementation of the zero current detecting unit 17. In order to reduce the power loss caused by current ripple in light-load conditions, the zero current detecting unit 17 is used to prevent reversed output inductor current $I_L$ and allow the buck converter to operate in discontinuous conduction mode (DCM). However, when load current $I_{LOAD}$ is small, the heavy-to-light load transient and down-tracking DVS transient response will be limited since the output voltage $V_O$ can only be discharged by a small $I_{LOAD}$. The effect is more significant in the down-tracking DVS transient response. In the present disclosure, the zero current detecting unit 17 is temporarily disabled to allow a reversed output inductor current $I_L$ when a large voltage difference between the feedback voltage $V_{FB}$ and the reference voltage $V_{REF}$, namely $V_{FB}-V_{REF}$, is detected so that output voltage $V_O$ can be discharged through the reversed output inductor current $I_L$.

The zero current detecting unit 17 uses a comparator and a D-type flip-flop to compare $V_{LX}$ with the ground and detect the gate terminal of the high-side power MOSFET to determine if the zero current detecting unit 17 is activated. In the present disclosure, an inverter and an AND gate are used to temporarily disable the zero current detecting unit 17 when the ZCD-disabling signal $V_{DZ}$ is pulled-high by the transient-optimized feedback unit 13 in FIG. 7, thereby realizing transient response optimization.

In conclusion, the present disclosure has the following advantages:

1. The buck converter is substantially a capacitor-current-controlled hysteretic buck converter, which is implemented to simultaneously optimize both a load transient response and a DVS transient response with insignificant increase of chip area and power consumption;

2. The optimized load transient response and DVS transient response are implemented for minimizing both output voltage undershoot/overshoot and settling time in the buck converter; and 3. The buck converter with a variable-gain feedback circuit for transient responses optimization has been implemented in a single chip, which is suitable for compact-sized portable devices.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A buck converter with a variable-gain feedback circuit for transient responses optimization, comprising:
   a power stage circuit with an input side and an output side, the power stage circuit comprising:
   a pair of switches electrically connected at the input side; and
   an output capacitor electrically connected at the output side; and
   a control circuit comprising:
   a current-sensing unit configured to sense an output capacitor current flowing through the output capacitor and convert the output capacitor current into a converting signal;
   an error-amplifying unit configured to receive a feedback voltage at the output side and a reference voltage to generate an error signal;
   a transient-optimized feedback unit comprising:
   a voltage difference sensing unit configured to receive the feedback voltage and the reference voltage to sense a voltage difference signal between the feedback voltage and the reference voltage; and
   a variable-gain amplifier with a variable gain value configured to receive the voltage difference signal to generate a proportional voltage signal by multiplying the voltage difference signal by a variable gain value;
   wherein the variable gain value is a function of the voltage difference signal; and
   a pulse width modulation (PWM) generation unit configured to receive the proportional voltage signal and a sensing signal to generate a PWM signal to control the switches, wherein the sensing signal is obtained by adding the converting signal and the error signal;
   wherein when the proportional voltage signal is equal to the sensing signal, the switches are controlled by the PWM signal to start charging or discharging the output capacitor.

2. The buck converter as claimed in claim 1, wherein the power stage circuit further comprises:
   an output inductor electrically connected between the switches and the output capacitor.

3. The buck converter as claimed in claim 2, wherein the PWM generation unit is configured to control an output inductor current flowing through the output inductor to start charging the output capacitor at a first time point and control the output inductor current to start discharging the output capacitor at an optimal time point.

4. The buck converter as claimed in claim 3, wherein the PWM generation unit is configured to control the output voltage to a target voltage at a second time point after the optimal time point.

5. The buck converter as claimed in claim 4, wherein an electric charge stored in the output capacitor from the first time point to a zero-crossing time point is equal to the electric charge stored in the output capacitor from the zero-crossing time point to the second time point.

6. The buck converter as claimed in claim 1, wherein the control circuit further comprises:
- a calculation unit configured to receive the converting signal and the error signal and add the converting signal and the error signal to generate the sensing signal, wherein the error signal is obtained in a negative feedback manner; and
- a driving unit configured to receive the PWM signal to drive the switches.

7. The buck converter as claimed in claim 6, wherein the control circuit further comprises:
- a zero current detecting unit configured to receive a zero current detecting signal generated from the transient-optimized feedback unit and an inductor input voltage at the input side to generate a zero current output signal;
- wherein the driving unit is configured to further receive the zero current output signal to drive the switches.

8. The buck converter as claimed in claim 1, wherein the error-amplifying unit comprises:
- an error amplifier configured to receive the feedback voltage and the reference voltage to generate the error signal; and
- a compensation capacitor electrically connected to the error amplifier's output node to reduce the change of the error signal when the error signal is generated.

9. The buck converter as claimed in claim 1, wherein the PWM generation unit is a hysteretic comparator, and is configured to detect whether the proportional voltage signal is equal to the sensing signal.

10. A buck converter with transient-holding unit, comprising:
- a power stage circuit with an input side and an output side, the power stage circuit comprising:
  - a pair of switches electrically connected at the input side; and
  - an output capacitor electrically connected at the output side; and
- a control circuit comprising:
  - an error-amplifying and transient-holding unit comprising:
    - an error amplifier connected to the output capacitor via a first output resistor at the output side and configured to receive a feedback voltage via a second output resistor connected to the first output resistor at the output side and a reference voltage to generate an error signal;
    - a switch electrically connected to the error amplifier and configured to control whether the error signal is passed, the switch is controlled by a transient detection signal wherein the transient detection signal is generated by a transient detection unit; and
    - a compensation capacitor electrically connected to the switch to reduce the change of the error signal and reduce the required compensation capacitance when the error signal is generated and passed through the switch; and
  - a PWM generation unit connected to the switch and the error amplifier and configured to receive the error signal and a sensing signal to generate a PWM signal to control the pair of switches, wherein the sensing signal is the feedback voltage at the output side or an inductor current sensing signal or a capacitor current sensing signal, wherein when the error signal is equal to the sensing signal, the switches are controlled by the PWM signal to start charging or discharging the output capacitor; and
  - a driving unit connected to the PWM generation unit and configured to receive the PWM signal to drive the pair of switches.

11. The buck converter as claimed in claim 10, wherein the power stage circuit further comprises:
- an output inductor electrically connected between the pair of switches and the output capacitor.

\* \* \* \* \*